Jan. 12, 1954
C. F. STANLEY
2,665,930
ECCENTRIC RING LOCKING MEANS
Filed June 21, 1950
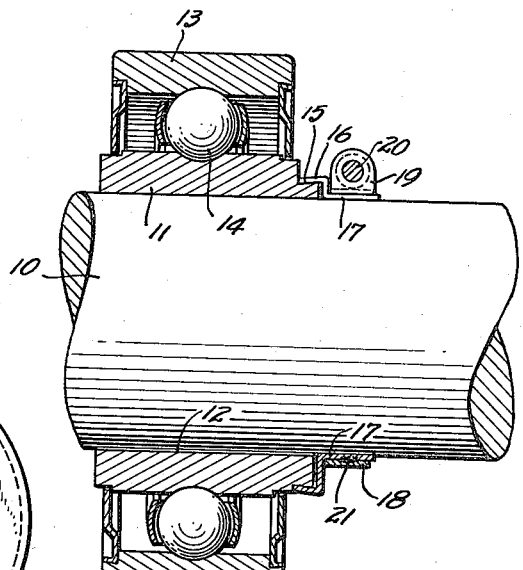
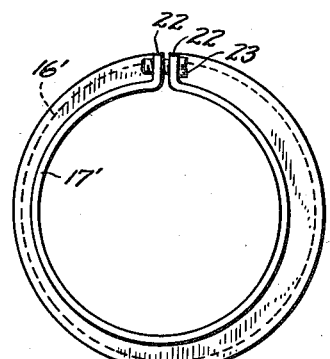
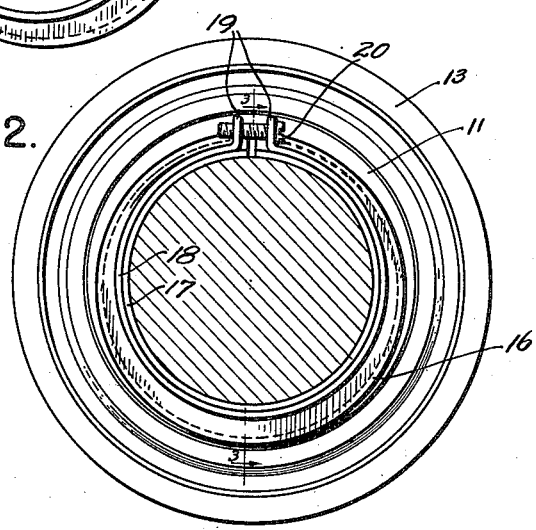
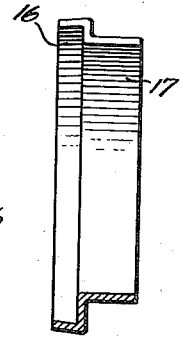
Inventor
CHARLES F. STANLEY
By Mitchell Bechert
Attorneys Patented Jan. 12, 1954

2,665,930

UNITED STATES PATENT OFFICE 2,665,930

ECCENTRIC RING LOCKING MEANS

Charles F. Stanley, New Britain, Conn., assignor to The Fafnir Bearing Company, New Britain, Conn., a corporation of Connecticut Application June 21, 1950, Serial No. 169,396

4 Claims. (Cl. 287—52.06)

My invention relates to means for securing an inner bearing ring or the like to a shaft.

It is an object of the invention to provide an improved device of the character indicated.

It is another object to provide an improved eccentric locking means effective to enhance a locking action upon relative rotation of the bearing ring or the like with respect to the shaft.

It is a specific object to provide an inexpensive, highly effective, easily installed, and easily removable locking means of the character indicated.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a longitudinal sectional view of a bearing mounted upon a shaft by means incorporating features of the invention;

Fig. 2 is a right-end view of the assembly of Fig. 1, the shaft being shown in section;

Fig. 3 is a longitudinal sectional view of a part used in the assembly of Fig. 1; and Fig. 4 is a right-end view of a slight modification to take the place of the part of Fig. 3.

Briefly stated, my invention contemplates employment of a split clamping collar or cup having a hub to engage a shaft and having an eccentric cup to engage the eccentric locking surface at one axial end of a suitably formed inner bearing ring. Clamping means may be provided to draw the split ends together so that the locking member may be anchored to the shaft, and so that, upon relative rotation of the shaft with respect to the inner bearing ring, the eccentric surfaces may bind so as to hold the inner bearing ring fast to the shaft. The clamping means may be integrally formed with the split collar, or a split clamp may be applied over the collar.

Referring to Figs. 1, 2, and 3 of the drawings, my invention is shown in application to the mounting of an antifriction bearing upon a shaft 10. The bearing may include an inner bearing ring 11 having a bore 12 to receive the shaft 10. An outer bearing ring 13 may be held in spaced relation with the inner bearing ring 11 by means of antifriction elements 14. One axial end of the inner bearing ring may be formed with an eccentric locking surface 15, which in the form shown is flared outwardly so that the highest point of eccentric surface 15 is at the axial end of the inner ring 11.

In accordance with the invention, I provide means in the form of a split collar or strap to be clamped to the shaft 10 and including an eccentric annular cup portion 16 of such dimensions as to fit over the eccentric surface 15. Thus, for the case of the outwardly flared locking surface 15, the annularly cupped portion 16 is correspondingly inwardly flared, as shown in Figs. 1 and 3. The locking member may have a bore to engage the shaft 10, and in the form shown this bore is longitudinally extensive over a cylindrical portion or hub 17. The hub 17 may be set upon the shaft 10 by clamping means effective to draw the split ends of the locking means together, and in the present case such clamping means extends circumferentially of the hub portion 17. Thus, the clamping means may include a band or strap 18 with outwardly bent lug ends 19, and a securing screw or bolt 20 may pass through one lug 19 for threaded engagement with the other lug 19, as shown in Fig. 2. If desired, for unit-handling relation, the clamping means 18 may be secured to the locking means 16—17, as by a simple spot weld, indicated generally at 21 (Fig. 1).

In Fig. 4, I show a modified construction wherein the clamping means for the locking ring is integrally formed with the locking ring. Thus, the locking ring may comprise a cylindrical hub 17' and an eccentric cup 16', but at the location of the split the hub portion 17' may be bent outwardly as to form opposed integral lugs 22—22. A clamping screw or the like 23 may pass through one of the lugs 22 for threaded engagement with the other. In Fig. 4, the split of the locking member is shown at a location intermediate the low and high points of the eccentric cup 16', whereas in the arrangement of Figs. 1, 2, and 3 the split is shown at the low point of the eccentric cup 16.

In use, the clamping means for the locking ring should be backed off or relaxed so as to permit some spreading of the split ring in order that the eccentric cup 16 may fit over the eccentric surface 15. The clamping means may then be set so as to hold the hub 17 on the shaft. This clamping action may or may not result in establishing a bind between eccentric surfaces 15—16 (or 15—16') but serves primarily to hold the locking ring 16—17 against rotation with respect to the shaft 10. The principal locking action occurs after the bearing has been rotated with respect to the shaft, that is, as the inner bearing ring 11 begins to creep around the shaft 10. Upon such creeping, the eccentric surfaces will be caused to jam, and once jammed there is no particular need for a secure clamping of the hub 17 on the shaft. However, the clamping means does serve to retain the eccentric binding relationship.

It will be appreciated that I have described a relatively simple inexpensive locking means for anchoring an inner bearing ring or the like to a shaft. The construction lends itself to installations where it may be desired to make more than one adjustment in the mounting of a bearing on a shaft, that is, in which it may be desired successively to clamp the bearing on the shaft at a number of shaft locations at various times during the life of the bearing and of the clamp. It will be noted that the cooperating relation between tapering or flared eccentric surfaces 15—16 (or 15—16') may not only assure against axial loss of the parts on a shaft, but that it may also assure a unit-handling relation of a bearing complete with locking ring.

While I have described my invention in detail for the preferred forms shown, it will be understood that modifications may be made within the scope of the invention as defined in the appended claims.

I claim:

1. As an article of manufacture, locking means for securing an inner bearing ring or the like to a shaft, said inner bearing ring having a bore and a continuous single circumferentially extending eccentric locking surface at one end, said article comprising a sheet metal collar having a cylindrical hub portion to engage the shaft and having an annularly cupped continuous single circumferentially extending eccentric portion to engage said eccentric surface, said collar being longitudinally split, and circumferentially extending band clamping means about said hub portion and including means spanning the split ends for drawing the split ends together, said band clamping means including radially outwardly extending ears and screw means connecting said ears.

2. An article according to claim 1, in which said ears are integral with said hub portions and are bent radially outwardly from said split ends.

3. An article according to claim 1, in which said band clamping means comprises a circumferential strap separate from said hub portion and circumferentially overlying said hub portion.

4. An article according to claim 1, in which the bore of said eccentric portion is inwardly flared to engage a correspondingly flared locking surface, the radially reduced end of said flared portion being opposite the clamping end of said locking means.

CHARLES F. STANLEY.

References Cited in the file of this patent
UNITED STATES PATENTS

| Number | Name | Date |
|---|---|---|
| 516,991 | Rusco | Mar. 20, 1894 |
| 1,821,877 | Bowne | Sept. 1, 1931 |
| 2,142,574 | Murden | Jan. 3, 1939 |
| 2,256,248 | Hansen | Sept. 16, 1941 |
| 2,301,634 | Nicholay | Nov. 10, 1942 |